United States Patent [19]

Borchard

[11] Patent Number: 4,828,057
[45] Date of Patent: May 9, 1989

[54] LEAF SPRING

[76] Inventor: John S. Borchard, 36 Whitney Tavern Rd., Weston, Mass. 02193

[21] Appl. No.: 141,213
[22] Filed: Jan. 6, 1988
[51] Int. Cl.$^4$ ............................ G01G 3/00; F16F 1/18
[52] U.S. Cl. ..................................... 177/225; 267/163
[58] Field of Search ................................ 267/158–160, 267/163, 164, 36.1, 47; 177/225

[56] References Cited

U.S. PATENT DOCUMENTS

| 2,036,637 | 4/1936 | Kingsbury | 267/158 X |
| 2,490,320 | 12/1949 | Pashby | 267/159 X |
| 2,676,404 | 4/1954 | Peckron et al. | 267/163 X |
| 3,752,246 | 8/1973 | Sullivan | 267/160 X |
| 4,738,324 | 4/1988 | Borchard | 177/225 |

FOREIGN PATENT DOCUMENTS 0204286  4/1939  Switzerland ..................... 267/164

Primary Examiner—George H. Miller, Jr.
Attorney, Agent, or Firm—John P. McGonagle

[57] ABSTRACT

A leaf spring made of a flat, thin, metallic strip comprised of an elongated flexible member with two parallel sides terminating at either end into flat rectangular, corss-like or circular shapes with a width approximately twice the width of the strip at its midpoint. The ends are crimped or cold pressed downward and then outward near their edges to form flanges. The crimped or pressed ends become each foot of the leaf spring.

13 Claims, 7 Drawing Sheets

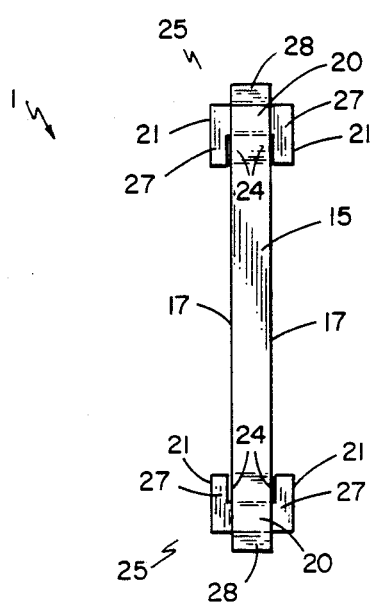
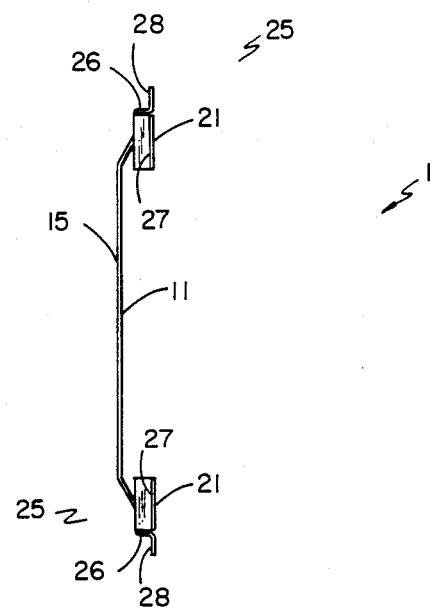
FIG. 2A  FIG. 2B
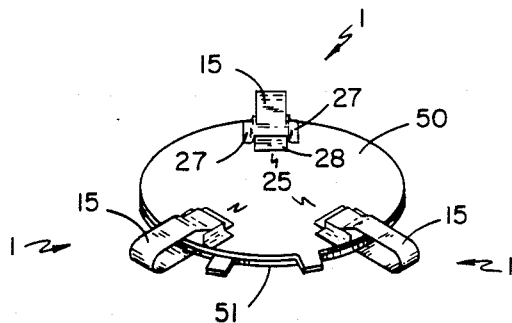
FIG. 2C
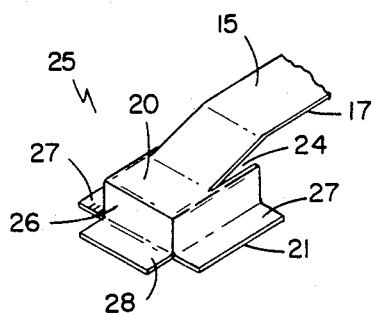
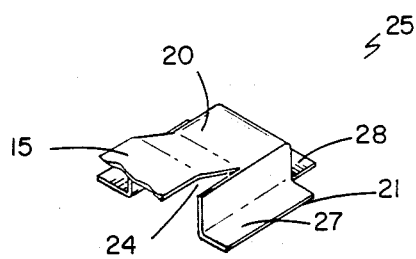
FIG. 3A  FIG. 3B

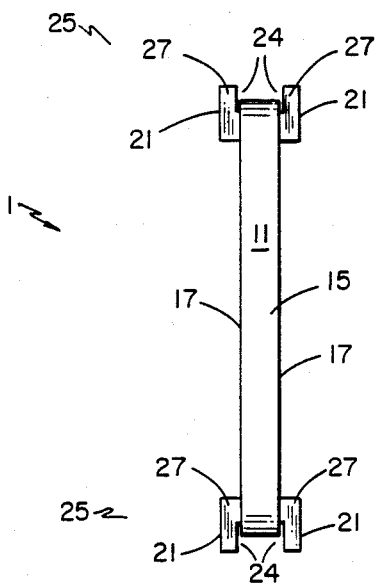
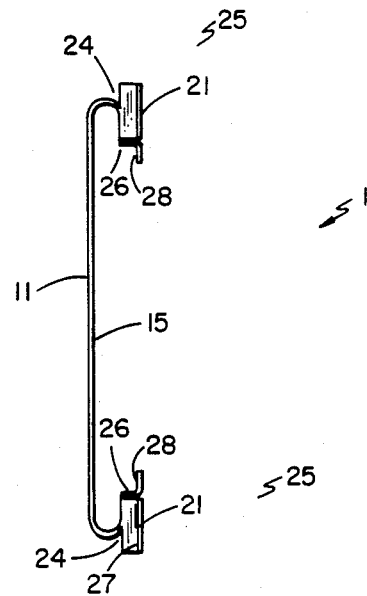
FIG. 4A          FIG. 4B
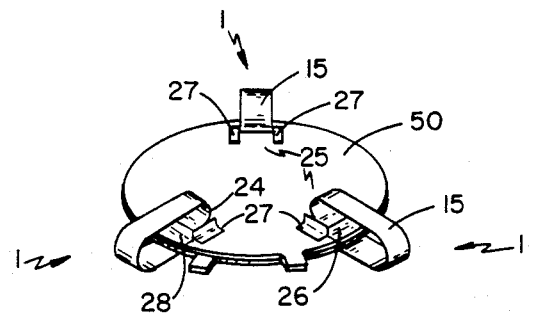
FIG. 4C
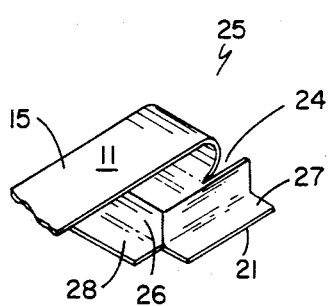
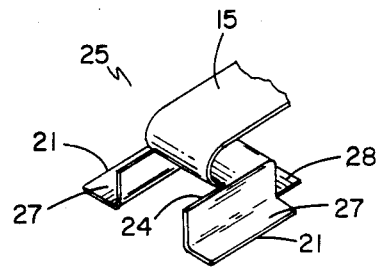
FIG. 5A          FIG. 5B

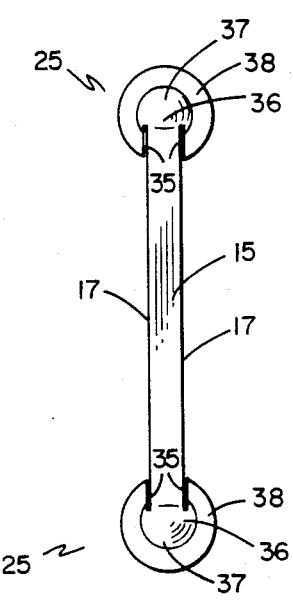
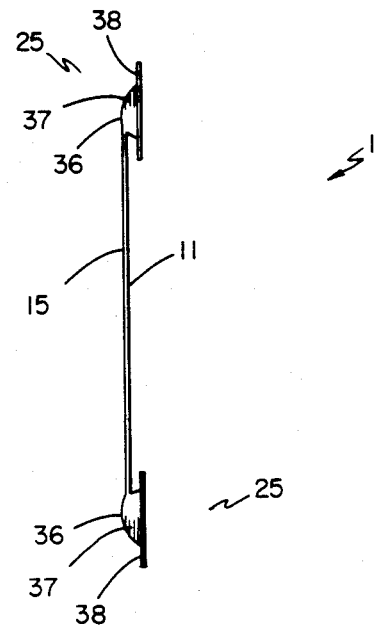
FIG. 7A  FIG. 7B
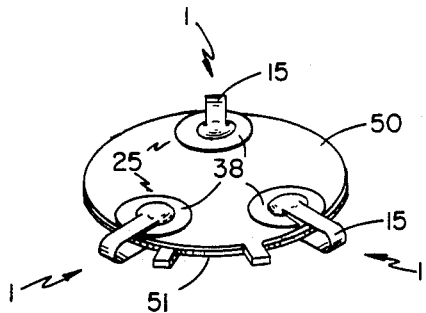
FIG. 7C
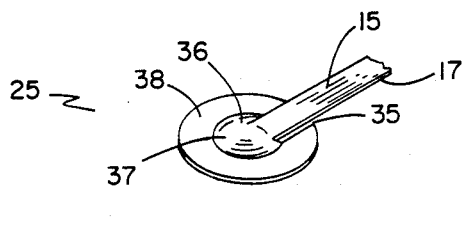
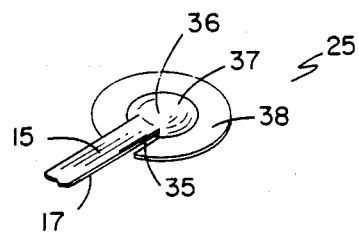
FIG. 8A  FIG. 8B

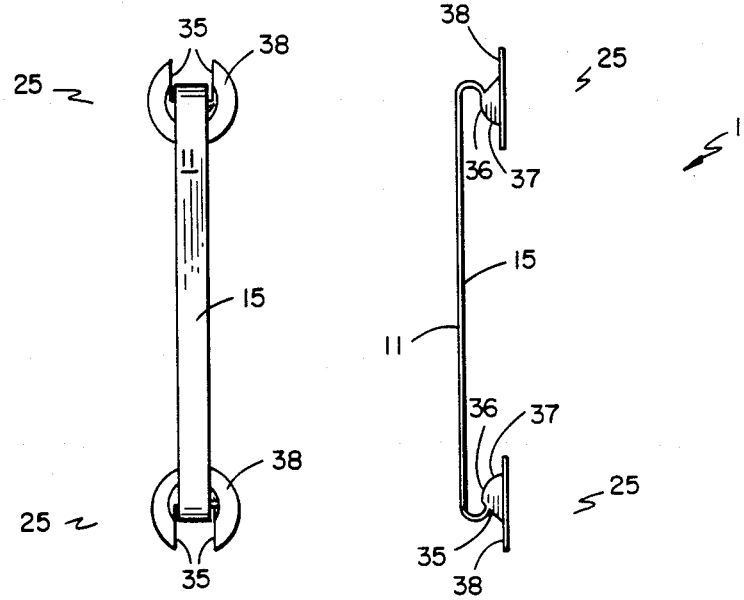
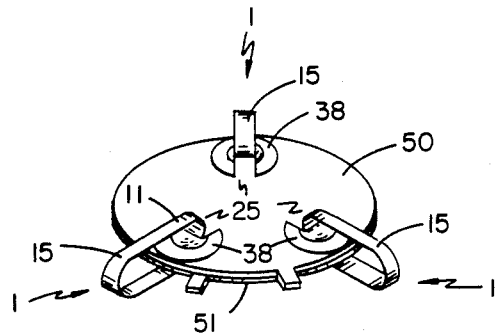
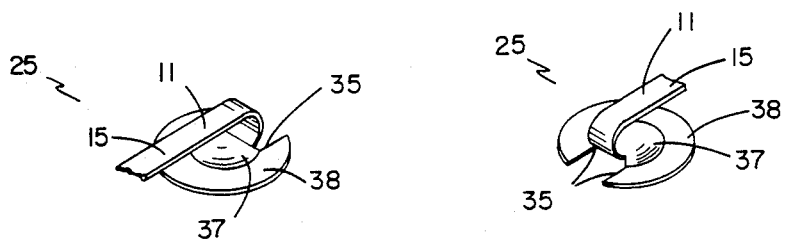
FIG. 9A  FIG. 9B
FIG. 9C
FIG. 10A  FIG. 10B ic
LEAF SPRING

BACKGROUND OF THE INVENTION

This invention relates generally to high performance springs, and more particularly to leaf springs used in measuring apparatus for very light masses and forces.

Mechanical springs used in measuring apparatus for very light masses and forces, such as gem scales and load cells, have stringent sensitivity requirements. The spring must be highly sensitive to load, and must accurately duplicate displacements for various loads. With leaf-type springs, this requires a very thin leaf member for sensitivity and a flat, rigid spring footing to prevent peeling stresses between the foot bottom and the surface it is adhered to, and thereby to insure accurate repeatability in displacements.

Heretofore, rigidity in the foot of leaf springs has been provided through thickness. Either the thin spring member is sandwiched between two thicker members at the foot, or the thin spring member is machined from a thick section making up the spring foot. Either approach has drawbacks when applied to leaf springs used in gem scales or load cells, especially of the type disclosed in my copending patent application, Ser. No. 07/018,176, filed 02/24/87, which discloses an electronic balance for measuring very light masses and capable of correcting an error in the measured value due to off-center placement of the mass to be weighed. Essential to the operation of said balance are the deflection measurements accomplished using a plurality of capacitors formed between two rigid, closely-spaced plates with specific patterns on the plates forming the capacitors. The plates are held apart by three or more springs Spaced around the periphery of the plates and attached thereto.

Leaf springs used in measuring apparatus for very light masses have a very thin leaf member. For strength, flexibility, repeatability and sensitivity, the leaf spring member is generally metallic. Because such a member is highly sensitive to very light loads, i.e., to 0.01 carat, it is also very sensitive to heat. The thicker a metal is, the longer it will take to thermally neutralize itself when subject to temperature changes, whereas a thin metal will neutralize itself quickly to the same temperature as the surrounding ambient air. Since the characteristics of metal change with heat, an apparatus with a thicker leaf spring, i.e., the leaf spring member or the leaf spring footing, may take up to one hour to thermally neutralize itself after being subject to a temperature change.

SUMMARY OF THE INVENTION

The present invention overcomes the disadvantages of the prior art and discloses a leaf spring footing which has the thinness of the leaf spring member in its foot, and also has the strength of the prior art leaf spring footings. The thinness of the entire leaf spring permits an apparatus using such a spring to be used much more quickly after a temperature change than has been heretofore possible. The leaf spring member and foot are made from the same thin metal strip. The ends of each strip initially are flat polygonal, rectangular, cross-like, or circular shapes with a width approximately twice the width of the strip at its midpoint. The ends of the strip are then cold pressed in a die forming a crimped shape along two or more sides of each end. The sides are crimped downward and then outward near their edges to form flanges. The crimped ends become each foot of the leaf spring. The resulting contour of the leaf spring footing gives the spring strength while at the same time maintaining uniform thinness throughout the leaf spring. The flanges provide flat, rigid portions in each spring footing for adhesion by gluing or other means to a surface, thereby substantially reducing the peeling stresses on the adhesive.

BRIEF DESCRIPTION OF THE DRAWINGS

FIGS. 2A, 2B and 2C are plan, side elevational, and perspective views, respectively, of one embodiment of the leaf spring of the present invention.

FIGS. 3A and 3B are perspective views from the front and rear, respectively, of the leaf spring footing of the embodiment illustrated in FIGS. 2A, 2B and 2C.

FIGS. 4A, 4B and 4C are plan, side elevational, and perspective views, respectively, of another embodiment of the leaf spring of the present invention.

FIGS. 5A and 5B are perspective views from the front and rear, respectively, of the leaf spring footing of the embodiment illustrated in FIGS. 4A, 4B and 4C.

FIGS. 7A, 7B and 7C are plan, side elevational, and perspective views, respectively, of another embodiment of the leaf spring of the present invention using the strip of FIGS. 6A and 6B.

FIGS. 8A and 8B are perspective views from the front and rear, respectively, of the leaf spring foot of the embodiment illustrated in FIGS. 7A, 7B and 7C.

FIGS. 9A, 9B and 9C are plan, side elevational, and perspective views, respectively, of still another embodiment of the present invention using the strip of FIG. 6.

FIGS. 10A and 10B are perspective views from the front and rear, respectively, of the leaf spring foot of the embodiment illustrated in FIGS. 9A, 9B and 9C.

DETAILED DESCRIPTION OF THE INVENTION

Figures 1A, 1B:
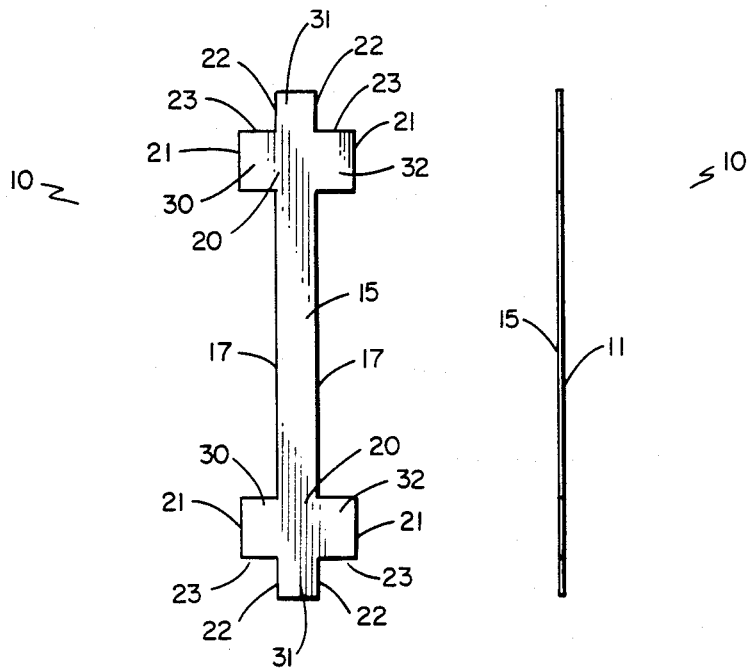
FIGS. 1A and 1B are plan and side elevational views, respectively, of a thin metal strip before formation into the leaf spring of the present invention.
Figures 6A, 6B:
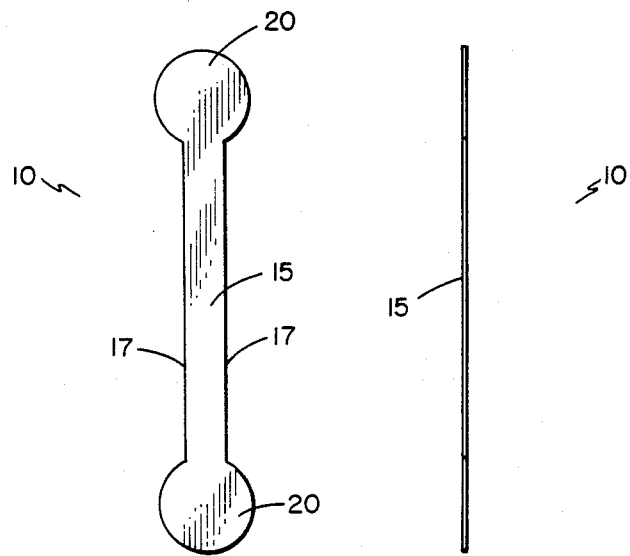
FIGS. 6A and 6B are plan and side elevational views, respectively, of a thin metal strip before formation into another embodiment of the present invention.

Referring to the drawings in detail, wherein like numerals refer to like elements, reference numeral 1 refers to the leaf spring of the present invention. FIG. 1 illustrates a flat, thin strip 10 in plan view (FIG. 1A) and side elevation (FIG. 1B) formed into an elongated flexible member 15, with two parallel sides 17, terminating at either end 20 in a generally flat, cross-like shape with a first width from edge 21 to edge 21 transverse to the longitudinal axis of the member 15 approximately two to three times the width from side 17 to side 17 of said member 15, and a second width from side 22 to side 22 transverse to the longitudinal axis of the member 15 approximately one to two times the width from side 17 to side 17 of said member 15. In the embodiments described herein, the strip 10 is metallic. However, the strip 10 could also be made of other materials such as ceramic, quartz, etc.

As may be best understood from FIGS. 2A, 2B, 2C, 3A and 3B, the cross-like shaped ends 20 are crimped downwardly and outwardly to form the spring footings 25. Specifically, a portion of each element 30, 31 and 32 forming the cross-like shaped end 20 of FIG. 1A is bent downwardly and outwardly. Elements 30 and 32 are bent along lines parallel to the longitudinal axis of the member 15 and extending from the edges 22, downwardly at an approximate 90° angle to the undersurface 11 of the strip 10, and then outwardly 90° forming two flanges 27 having a longitudinal axis and running in a plane parallel to the longitudinal axis and plane of the member 15. The edges 21 now form the outer edge of the flanges 27 and are parallel to the member sides 17. The third element 31 is bent along a line transverse to the longitudinal axis of the member 15 and extending between the edges 23 at right angles to the edges 21 and 22, downwardly at an approximate 90° angle to the undersurface 11 of the strip 10 and then outwardly 90° forming a flange 28 having a longitudinal axis transverse to the longitudinal axis of the member 15 and running in a plane parallel to the plane of the member 15. In this embodiment of the invention, the leaf spring foot 25 extends generally downward from the elongated member 15 although still apiece with the member 15. The shaping of the footing 25 as described above provides strength while at the same time maintaining the thinness of the leaf spring elongated flexible member 15 throughout, the member 15 being the spring element of the leaf spring 1. The flanges 27 and 28 provide a flat, rigid structure in the foot 25 for adhesion to a surface thereby substantially reducing peeling stresses. Two cuts 24 are made extending into the strip ends 20 on a line extending from the member sides 17. The purpose of these cuts 24 is to move the effective force on the footing 25 from the spring element 15 toward the middle of the footing 25 thereby further reducing the peeling effect on the flanges 27. The primary purpose of forming the flange 28 is to provide transverse rigidity to the footing 25. The flange 28 itself may be eliminated as long as the downwardly extending wall 26 remains. When installing this embodiment of the leaf spring 1, such as may be seen in the perspective view of FIG. 2C, the elongated member 15 has a slightly upwardly curving shape at the footing 25. This is done to prevent opposite curvature of the flexible member 15 and ensure linearity. In this example, two capacitor plates 50 and 51 are held between several leaf springs 1 of the present invention, such as in the gem scale described in detail in my co-pending application, Ser. No. 07/018,176, filed 02/24/87, referred to above. The upper capacitor plate 50 is held by one foot 25 of each leaf spring 1. Specifically, the flanges 27 and 28 of the foot 25 are glued to the plate 50. The spring elements 15 of each spring 1 are then bent around and below the bottom capacitor plate 51 so that the other foot 25 of each spring 1 may be attached to the bottom capacitor plate 51. Again, the flanges 27 and 28 of the foot 25 of each spring 1 are glued to the plate 51.

The advantages to the embodiment described above are that it is relatively easy to make, provides thinness of the leaf spring element 15 throughout, and provides a strong footing 25 with excellent resistance to peeling stresses between the leaf spring's foot bottom, i.e., flanges 27 and 28, and the surface, e.g., 50, 51, it is adhered to.

FIGS. 4A, 4B, 4C, 5A, and 5B illustrate another embodiment of the invention. This leaf spring 1 is formed in essentially the same manner as the above described embodiment, but installation of the leaf spring 1 is different. As may be best understood by comparing FIG. 2B to 4B, and FIG. 2C to 4C, the flexible member 15 is bent back over the footing 25 instead of directly extending from the footing 25 as was the case with the first embodiment. In the first embodiment of the leaf spring 1, the foot 25 is more directly related to the flexible member 15. The second embodiment has a double spring action for more vertical force effect on the foot 25. Because the first embodiment has less parallel motion, there will be a rotary stress on the glue adhering the flanges 27 and 28 to the surfaces 50 and 51. The bent over design of the second embodiment decreases rotary action and, therefore, less stress is put on the glue. Although mechanical creep, i.e., stress-time effect, is always present, there is less in the second embodiment because of the double spring action of the reconfigured leaf spring 1.

In still another embodiment of the invention, as shown in FIGS. 6A, 6B, 7A, 7B, 8A and 8B, the ends 20 of each strip 10 initially are flat rounded shapes with radial diameters approximately twice the width of the member 15 at its midpoint. The centers of the rounded ends 20 of the strip 10 are then cold pressed in a die concentrically forming a domical contour 37 in each rounded end with a residual flange 38 about the edge of the dome 37. Each rounded end 20 is cut in a line 35 on either side 17 of the elongated member 15 to a depth into each rounded end 20 near to an apex 36 formed by the domical contour 37. The elongated member 15 lies flat in a plane nearly touching the apexes 36 of the domical contour 37 of each end 20. The leaf spring foot 25 is, therefore, generally positioned for the most part below the elongated member 15 although still apiece with the member 15. The domical contour 37 of the spring footing 25 provides strength while at the same time maintaining the thinness of the leaf spring elongated member 15 throughout the entire leaf spring 1. Although the first two embodiments of the leaf spring have superior mechanical creep characteristics, the domical embodiment with its continuous residual flange 38 has more all-around glue surface and provides, thereby, a stronger footing 25.

As was illustrated in the first two embodiments, the leaf spring 1 described immediately above may be installed so that the elongated member 15 is bent back over the footing 25 instead of directly extending from the footing 25 as was the case with the embodiment described immediately above. FIGS. 9A, 9B, 9C, 10A and 10B most clearly illustrate this. This embodiment provides also a double spring action for a more vertical force effect on the footing 25. This configuration will also have less mechanical creep than the embodiment described immediately above.

Figure 11:
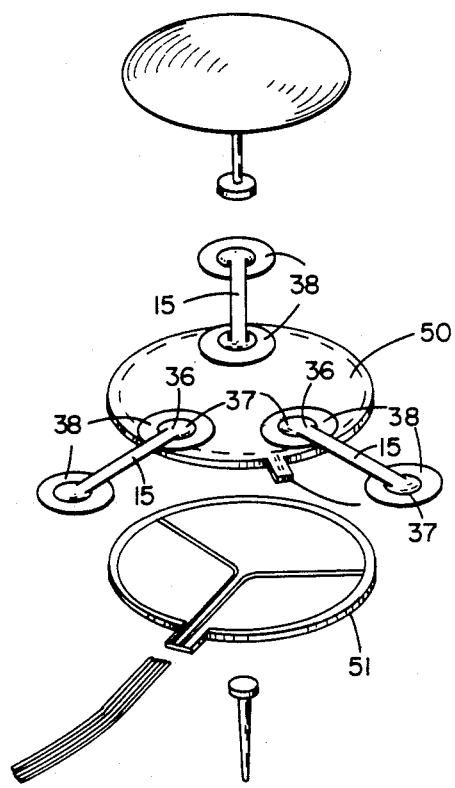
FIG. 11 is an exploded perspective view of a section of an apparatus using the leaf spring of FIGS. 7 and 8.
Figure 12:
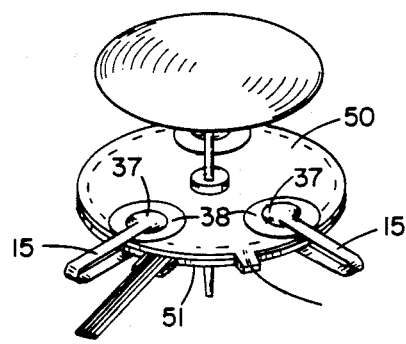
FIG. 12 is a perspective view of a section of an apparatus using the leaf spring of FIGS. 7 and 8.

FIGS. 11 and 12 illustrate the invention 1 in use. In this application used in a gem scale, two capacitor plates 50 and 51 are held between three leaf springs 1 using the invention embodiment illustrated in FIGS. 7A, 7B, 7C, 8A and 8B. The upper capacitor plate 50 is held by one foot 25 of each leaf spring 1. The member 15, i.e., spring element, of each spring 1 is then bent around and below the bottom capacitor plate 51 so that the other foot 25 of each spring 1 may be attached to the bottom capacitor plate 51. The springs 1 in this application will quickly attain thermal neutralization after temperature changes due to the springs' uniform thinness throughout.

It is understood that the above-described embodiment is merely illustrative of the application. For example, the cross-shaped ends 20 in FIGS. 1A and 1B may be rectangular and element 31 eliminated, resulting in a two-flanged 27 spring footing 25. The ends 20 may also each have a polygonal shape, providing a compromise of features between the rectangular/cross-shaped end embodiments and the rounded end embodiments. The polygonal shape would have four or more edges and would be formed into footings with four or more sides having multiple flanges. The elongated flexible member 15 of any embodiment may also be stiffened without sacrificing thinness. Slight corrugations may be added to the elongated member 15 for a stiffer spring element. Although the above embodiments used as a preference metal strips, the strip 10 could be comprised of other materials such as ceramic or quartz, or combinations thereof of metal, ceramic or quartz. Other embodiments may be readily devised by those skilled in the art which will embody the principles of the invention and fall within the spirit and scope thereof.

I claim:

1. A leaf spring used in measuring masses and forces, comprised of:
   a flat, thin strip formed into an elongated flexible member terminating at either end into rectangular, cross-like shapes with an overall width greater than the width of the elongated member wherein each end has three elements forming the cross-like shaped end, of which two are side elements and the third is a middle forward element and wherein said side elements are bent downward along lines parallel to the longitudinal axis of said elongated flexible member and then outward near said outer side edges to form flanges.
2. A leaf spring in accordance with claim 1 wherein: each end is cut in a line on either side of the elongated member part way into each end approximately to a point parallel to a midpoint of said outer side edges.
3. A leaf spring in accordance with claim 1 wherein: said middle forward element has a forward outer edge transverse to the longitudinal axis of the elongated flexible member.
4. A leaf spring in accordance with claim 3 wherein: said middle forward element is bent downward along a line transverse to the longitudinal axis of said elongated flexible member and extending from the foremost points of said outer side edges.
5. A leaf spring in accordance with claim 4 wherein: said middle forward element is bent outward near said forward outer edge to form a flange.
6. A leaf spring in accordance with claim 5 wherein: said flanges formed from said three elements lie in a plane generally parallel to the plane in which the elongated flexible member lies flat.
7. A leaf spring in accordance with claim 6 wherein: said strip's formed ends are the leaf spring's footings.
8. A leaf spring in accordance with claim 7 wherein: said side elements have outer side edges parallel to the longitudinal axis of the elongated flexible member.
9. A leaf spring in accordance with claim 6 wherein: the thinness of the strip is uniform throughout the elongated flexible member and footings.
10. A leaf spring in accordance with claim 9 wherein: said strip is made of metal.
11. A leaf spring in accordance with claim 10 wherein: said leaf spring is installed such that said elongated flexible member is bent back over one or more said footings.
12. A leaf spring in accordance with claim 11 wherein: said elongated flexible member has slight corrugations for stiffness.
13. A leaf spring in accordance with claim 10 wherein: said elongated flexible member has slight corrugations for stiffness.

* * * * *